F. MILO.
Transplanting Implement.
No. 42,391. Patented Apr. 19, 1864.
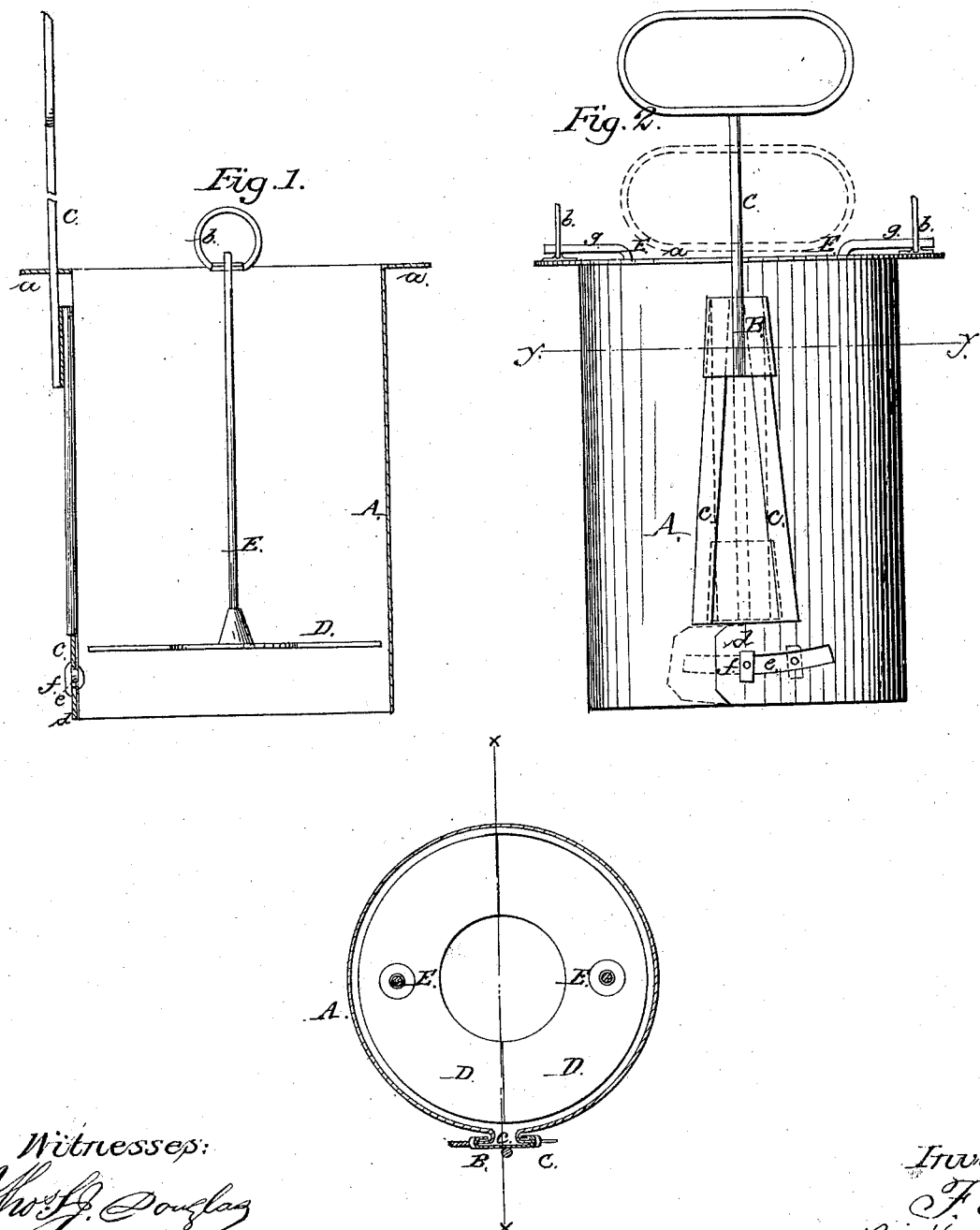

UNITED STATES PATENT OFFICE.

FRANCIS MILO, OF KINGSTON, CANADA WEST.

IMPROVEMENT IN IMPLEMENTS FOR TRANSPLANTING.

Specification forming part of Letters Patent No. 42,391, dated April 19, 1864.

*To all whom it may concern:*

Be it known that I, FRANCIS MILO, of Kingston, in the county of Frontenac and Province of Canada West, have invented a new and useful Device for Transplanting or Removing Plants and Shrubs without Injuring their Roots; and I do hereby declare that the following is a full, clear, and exact description of the same, reference being had to the accompanying drawings, making a part of this specification, in which—

Figure 1 is a vertical section of my invention in an uncompressed state, taken in the line *x x*, Fig. 3; Fig. 2, an elevation of the same; Fig. 3, a horizontal section of the same, taken in the line *y y*, Fig. 2.

Similar letters of reference indicate corresponding parts in the several figures.

The object of this invention is to obtain a simple and efficient device by which shrubs and plants may be transplanted with facility and without injuring their roots.

To enable those skilled in the art to fully understand and construct my invention, I will proceed to describe it.

A represents a sheet-metal case of cylindrical form, and provided at its upper end with a flange, *a*, having handles or rings *b b* attached to it. This case A is cut longitudinally in beveled form, as shown clearly in Fig. 1, and the edges are bent over to form lips *c*, on which a slide, B, is fitted, as shown clearly in Figs. 1 and 3. This slide B has a rod, C, attached to it, which passes up through the flange *a*. The lips *c* do not extend the whole length of the case A. An overlap, *d*, is allowed at the lower end of the latter, at one side, which overlap has an oblong slot, *e*, made in it, through which a rivet, *f*, passes, said rivet being attached to the opposite side of the case. The rivet *f* is provided with a head, which holds the overlap in proper position. This will be fully understood by referring to Fig. 2. The bottom of the case A is open.

D D represent two semi-annular plates, each of which has a rod, E, attached to it. These plates are of such dimensions that they may pass into the case A. The upper ends of the rods E are bent over in a horizontal position, as shown at *g*.

The implement is used as follows: The case A is placed over and around the plant or shrub to be transplanted or removed, and is pressed down into the earth the requisite depth, and the slide B is then forced down, thereby drawing toward each other the two edges of the case A, and contracting the same and causing it to compress the earth within in an easy or gradual manner, so as not to injure the fibers of the roots in the slightest degree. The case A and the plant or shrub are then drawn upward and out from the earth and reset into a hole in the earth previously made by the case A at the desired spot. The slide B is there drawn up and the case A expands to its original dimensions. The plates D D are then placed on the top of the earth within the case A, and the little fingers of the hands are inserted in the rings *b*, while the thumbs are placed on the horizontal parts *g* of the rods E. The case is thus withdrawn from the earth, leaving the contents in the hole prepared for its reception.

Having thus described my invention, what I claim as new, and desire to secure by Letters Patent, is—

The case A, constructed so as to be expanded and contracted by the movement of the slide B, in combination with the plates D D, all arranged substantially as and for the purpose set forth.

FRANCIS MILO.

Witnesses:
SAMUEL MUCKLESTON,
W. MARSHALL.